Inventor
Harry G. Cunningham
By Orl R. Goshaw
Attorney

Jan. 14, 1941.  H. G. CUNNINGHAM  2,228,247
STEERING CONTROL MECHANISM
Original Filed July 20, 1937   3 Sheets-Sheet 2
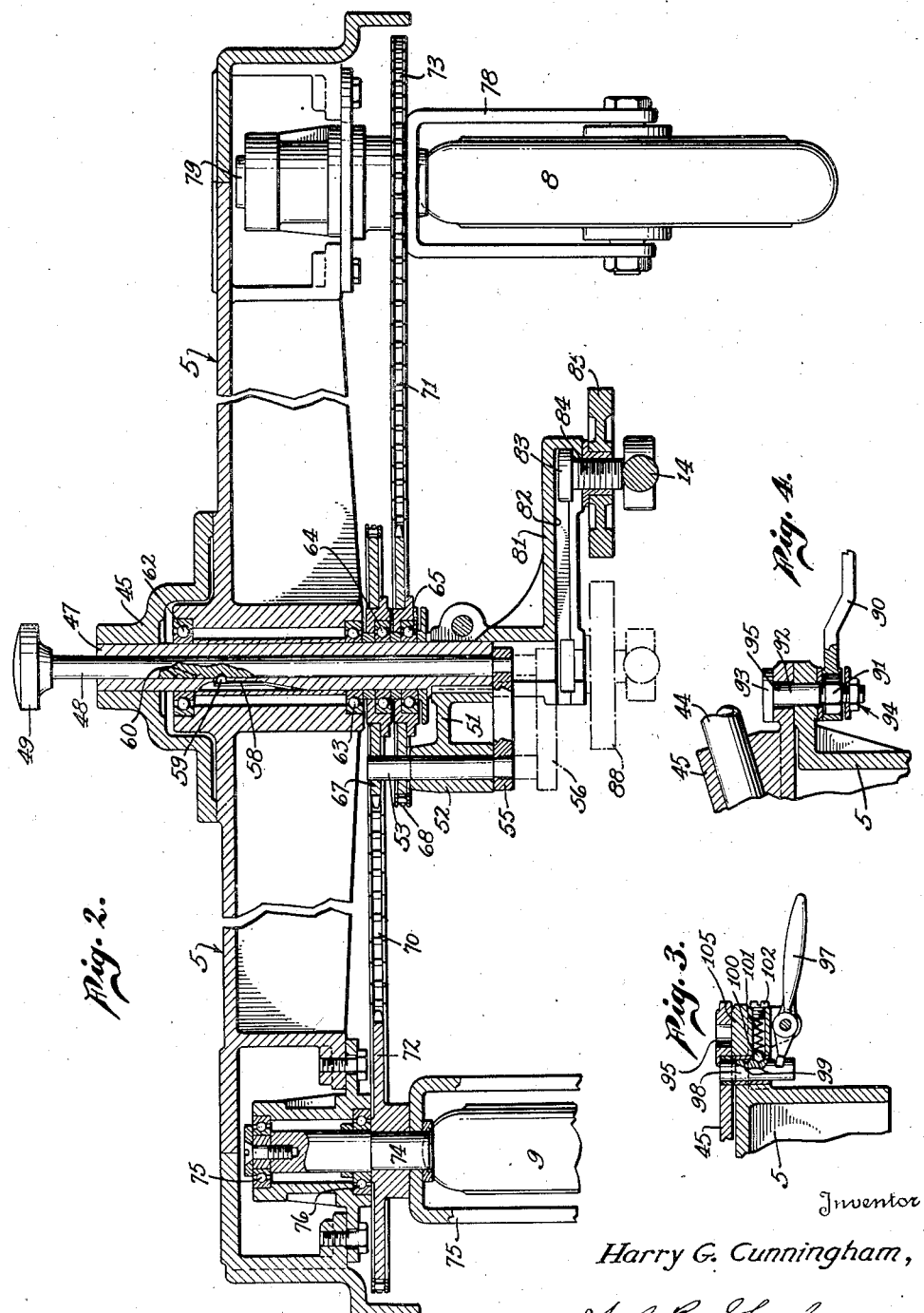
Inventor
Harry G. Cunningham,
By
Attorney Jan. 14, 1941.   H. G. CUNNINGHAM   2,228,247
STEERING CONTROL MECHANISM
Original Filed July 20, 1937   3 Sheets-Sheet 3

Inventor
Harry G. Cunningham
By
Attorney

Patented Jan. 14, 1941

2,228,247

UNITED STATES PATENT OFFICE 2,228,247

STEERING CONTROL MECHANISM

Harry G. Cunningham, Los Angeles, Calif., assignor to Radio Keith Orpheum Corporation, a corporation of Maryland Original application July 20, 1937, Serial No. 154,587. Divided and this application June 24, 1938, Serial No. 215,614

14 Claims. (Cl. 280—48)

This invention relates to motion picture apparatus and particularly to a motion picture camera truck or dolly wherein the vertical and horizontal adjusting mechanism for the camera may be moved or bodily translated in any direction along straight or curved paths.

This application is a division of my co-pending application Serial No. 154,587, filed July 20, 1937.

The principal object of the invention is to facilitate the bodily transition or movement of a motion picture camera within a given area.

Another object of the invention is to facilitate the transportation of the elevating mechanism of a motion picture camera from place to place without undue loss of time and without affecting the stability of the mechanism.

A further object of the invention is to facilitate the control of the transporting mechanism.

A still further object of the invention is to provide a steering mechanism which will permit movement of a camera dolly truck along any fixed path, either straight or curved.

Camera trucks and dollies are well known in the art even to those of the general nature of this invention, which, in brief, is a dolly having wheels for transporting it and its camera from place to place, and a boom with an elevating mechanism for the boom and camera, the boom being rotatable and tiltable. The fundamental requirements of such a motion picture camera dolly are sturdiness, flexibility as to movement from place to place, stability when operating the camera during "takes" and simplicity insofar as adjustment controls are concerned. The present invention embodies all these features, while simplifying the various elements and arranging the controls more advantageously than heretofore.

In present-day motion picture practice the motion picture camera and the equipment directly associated therewith is of considerable weight inasmuch as it not only includes the camera mechanism, with its view finder, lens shade and immediate camera accessories, but also a soundproof housing or blimp which entirely surrounds the camera mechanism to prevent the noise of the operating mechanism from reaching the recording microphone. Thus, the dolly must be sufficiently sturdy to support this weight. With a dolly of the boom type, having the camera supported at the end thereof, it is realized that a construction must be provided to not only support this weight, but also a counterbalance of equal or greater reaction depending upon the pivot position of the boom. Furthermore, the cameraman and/or his assistant must operate the camera, and, therefore, their weights are added either directly on the boom itself or at least upon the truck portion of the dolly.

Other problems involved in facilitating the movement or bodily transition of the camera during a "take" are ease and smoothness of rotation, elevation and tilt of the boom for various "pan" shots or such shots taken wherein the camera is moved in straight or curved paths across the set. The dolly must also be able to be moved at various angles for projecting the camera within openings such as windows or doors of the set. In the present dolly all of these features have been provided by a construction which not only permits the operator to quickly make the adjustments, but which is simplified to a point where the adjustments may be made with the greatest efficiency. The details of the camera boom and elevating mechanism therefor are described and claimed in the above-mentioned copending application. This application is directed to the truck portion of the dolly structure which permits the elevating and supporting mechanism for the boom and camera to be moved in any desired or predetermined path of travel either across or within a set.

Although the novel features which are believed to be characteristic of this invention will be pointed out with particularity in the claims appending herewith, the manner of its organization and the mode of its operation will be better understood by referring to the following description read in conjunction with the accompanying drawings forming a part thereof, in which:

Figure 2 is an elevational cross-section along the line 2—2 of Fig. 1;

Figures 3 and 4 are detail views showing the locking arrangements for the steering mechanism;

Figure 1:
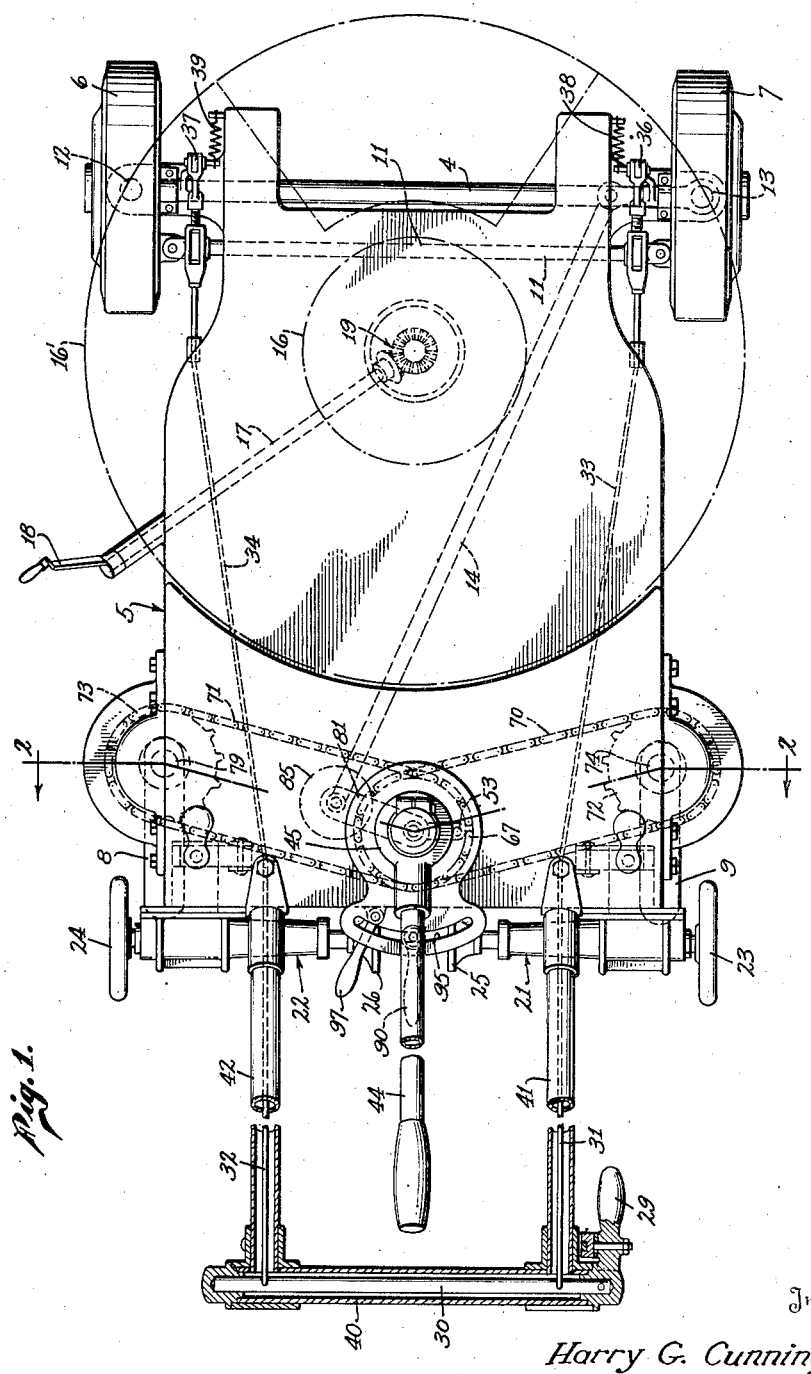
Figure 1 is a plan view of the dolly truck platform showing the interconnecting steering mechanism between the wheels.

Referring now to Fig. 1, a substantially rectangular platform 5 is supported at the front end thereof by wheels 6 and 7, and at the rear by wheels 8 and 9, the wheels 6 and 7 having an axle 4 and an interconnecting steering bar 11, while the wheels 8 and 9 are of the caster type. The front wheels 6 and 7 are adapted to be turned about king pins 12 and 13 when actuated by a steering rod 14 under the platform 5. The wheels 8 and 9 are turnable about vertical axes directly above their axes of rotation. The camera boom and its elevating mechanism are not shown but are supported at the position shown by the dotted circle 16, while the platform is shown by circle 16'. The shaft 17, handcrank 18 and gears 19 operate the elevating mechanism, the details of this structure being disclosed in the above identified co-pending application.

Attached to the rear of the truck are jacks 21 and 22 having hand wheels 23 and 24 and contact shoes 25 and 26, respectively, these jacks being employed to level and stabilize the dolly when so desired. Also, in Fig. 1, is shown a brake control mechanism for temporary stops, this mechanism comprising a handle 29 for turning a shaft 30 which pulls rods 31 and 32 and horizontal links 33 and 34 attached to brake mechanisms 36 and 37, releasing of the brakes being accomplished by springs 38 and 39.

For moving the truck from place to place, the hollow crossbar handle 40 is employed, the handle 40 being fixedly attached to the truck frame by hollow tubing 41 and 42. For guiding or steering the truck over different courses, a steering handle 44 is placed midway between the members 41 and 42, the handle being fixedly inserted in an opening of a casting or quadrant section 45. The member 45 is attached to a hollow shaft 47 within which is a slidable pin 48 having a hand knob 49 (see Fig. 2). The shaft 47 is rotatable on bearings 62 and 63 and is connected at its bottom end with a horizontally extending fixture 51, which has mounted in portion 52 thereof a vertically slidable clunk pin 53. The clunk pin is connected to the vertical rod 48 by a crossbar 55 so that movement of the rod 48 vertically adjusts the vertical position of pin 53, the extreme lower position of the pin and bar 55 being shown by the dotted lines 56. The pin 53 is also adjustable to an intermediate position and is maintained in any of its three positions by means of a spring 58 holding a ball 59 in any one of three respective notches 60.

From the above, it is seen that rotation of the quadrant member 45 by steering handle 44 rotates the hollow shaft 47, thus rotating the fixture 51 and the clunk pin 53. This rotation may turn the wheels 8 and 9, as will now be described. Upon ball bearings 64 and 65 are mounted two sprocket wheels 67 and 68, respectively. Around the sprocket wheels 67 and 68 are chains 70 and 71 which connect with similar sprocket wheels 72 and 73. The sprocket wheel 72 is fixedly attached to a vertical shaft 74 to which is connected a caster yoke 75, the wheel 9 thus supporting the frame 5. The shaft 74 is mounted upon ball bearings 75 and 76 so that turning of the sprocket 72 will turn the wheel 9 upon a vertical axis through the shaft 74. Similarly, the wheel 8, which is mounted on a yoke 78 and a vertical shaft 79, is turned with rotation of sprocket 73. Thus, rotation of the quadrant 45 will turn sprocket wheels 67 and 68, sprocket wheels 72 and 73 and wheels 8 and 9 if the clunk pin 53 is in its full-line position where it contacts sprockets 67 and 68 through openings therein. With the clunk pin 53 in its dotted position, no rotation of sprockets 67 and 68 will occur, and thus no turning of the wheels 8 and 9. With the clunk pin in an intermediate position, however, only lower sprocket 68 will be rotated, thus turning wheel 8 only and leaving wheel 9 free to caster.

From the mechanism just described, therefore, it will be seen that the handle 44 can control both of the rear wheels 8 and 9 or only wheel 9 for steering purposes. Now for steering the front wheels 6 and 7, the rear end of connecting rod 14, shown in Fig. 1, is attached to the steering mechanism by being mounted on an extending fixture 81 which is connected to and turnable with hollow shaft 47. The member 81 has a slot 82 therein with depressions at each end to accommodate the head 83 of a bolt 84 which carries the end of rod 14. Upon the bolt 84 is threaded a hand wheel 85 which, when tightened, will fixedly maintain the head of bolt 84 in the depression at either end of the slot 82. When the bolt and its associated elements are in the position shown in the full lines, rotation of shaft 47 rotates fixture 81 and thus moves the rod 14 and turns the front wheels. When the bolt is in the position shown by the dotted lines 88, the axis of the bolt will be concentric with the axis of shaft 47 so that rotation of the shaft 47 will not move the end of the rod 14, and thus there will be no steering action.

Therefore, manipulation of the handle 44 may or may not effect steering of the front wheels 6 and 7 together with or without a steering action of the rear wheels 8 and 9 as explained above. Thus, with clunk pin 53 in its upper position and bolt 84 in its full-line position "crab crawl" is obtainable, as all four wheels will always be in parallel planes and the truck will move in a straight line for any particular setting of the handle 44. Such action is desirable particularly when a traveling shot is taken across a set, and the boom has been set with respect to the frame 5 for fixed operation. It is also realized that only the rear wheels may be steered, permitting the truck to be rotated about the front wheels as a pivot.

It frequently happens that a definite path for the truck must be determined for a particular "pan" shot and the truck is moved over this path many times during rehearsal. In this case the steering mechanism may be locked in any desired position by means of the mechanism shown in Fig. 4. This attachment consists of a handle 90 located under the steering handle 44 when the latter is at its central position. The handle 90 has a sprocket wrench tip fitting over and maintained by washer-and-nut combination 94 on a nut 91 of a bolt 92 having a head 93, the bolt passing through a slot 95 in the rear portion of the quadrant 45 and a hole in a bracket of the frame 5 (see Fig. 1). Thus, the quadrant, when turned by the handle 44, moves over the bolt; and when the desired steering angle has been determined, the handle 90 is turned, tightening the bolt and thus locking the quadrant member 45 in fixed position with respect to the frame 5. After the steering mechanism has been locked in position, the dolly is then moved by means of the crossbar handle 40 fixedly attached to the frame.

For quickly determining and fixedly positioning the wheels in a straight-ahead position, the attachment shown in Fig. 3 is employed. This unit comprises a handle 97 fitted into a notch of a pin 98 for moving the pin vertically, the pin having two positions and maintained in any desired position by notches 99 into which are pressed, at respective times, a ball 100 by a spring 101 held against the ball by a set screw 102. An ear 105 projects from the frame 5 to serve for supporting the handle 97 and its associate mechanism. Thus, lowering of the handle 97 will insert the pin held by the ear 105 through a hole in the quadrant 45, while lifting the handle 97, releases the quadrant. In this manner the straight-ahead position of the wheels is easily determined and obtained at any time.

Figure 5:
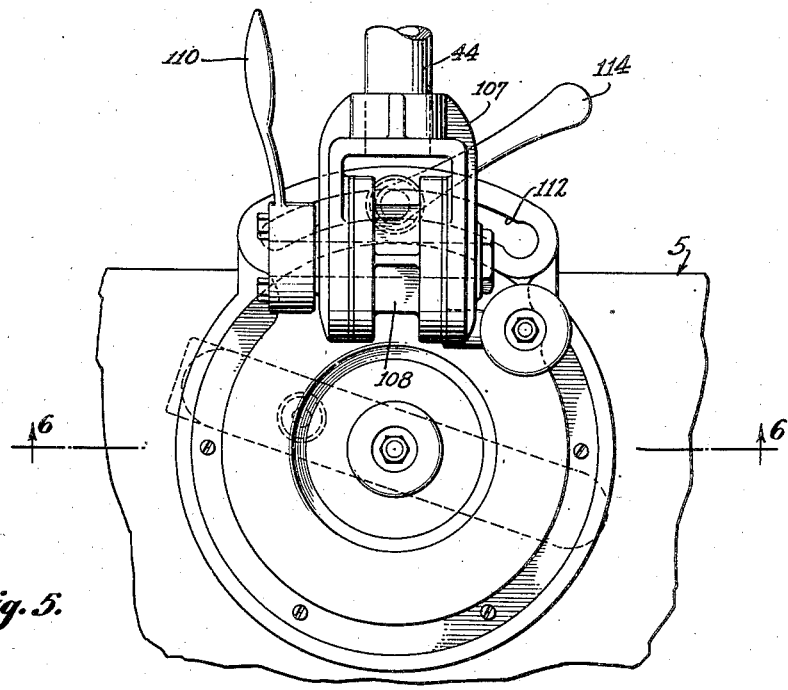
Figure 5 is a plan view of a modification of the steering control.
Figure 6:
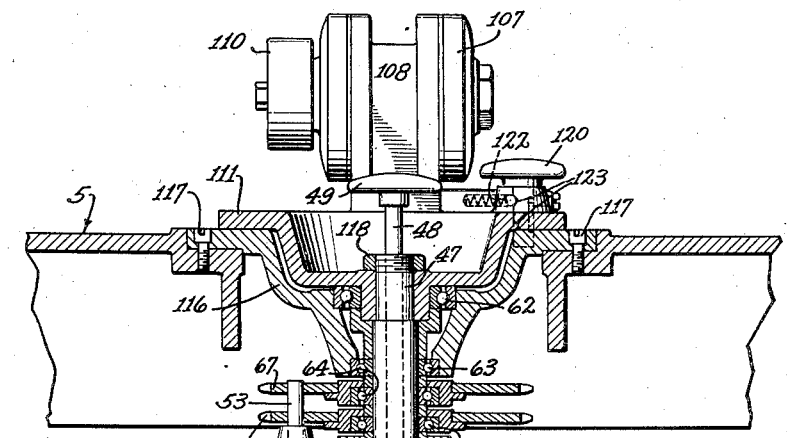
Figure 6 is an elevational cross-section along the line 6—6 of Fig. 5.

Referring now to the modification of the central portion of the steering control shown in Figs. 5 and 6, similar elements performing the same function as the elements in Figs. 1 to 4 have been given like numerals. The steering handle 44, for instance, is now connected with a yoke member 107 which straddles a shaft housing 108 which has mounted at one end thereof a lever 110 which will tighten the yoke in any desired angular position. Thus, the steering handle 44, instead of being at a fixed angle as shown in Figs. 1 and 4, may now be tilted to any desired position. The shaft housing 108 is mounted on a circular dished member 111 similar to the member 45 of Fig. 2, this member having a slot 112 therein similar to the slot 94 shown in Fig. 1. A handle 114 operates on a bolt for fastening the member 111 in any desired angular position similar to the handle 90 of Fig. 4.

The dished member 111 is rotatable upon a conically-shaped hanger 116 fastened to the frame 5 by screws 117. The member 111 is fixedly attached to a shaft 47 by a nut 118, the shaft being rotatable on bearings 62 and 63. Around the lower portion of the shaft 47 are sprocket wheels 67 and 68 mounted on bearings 64 and 65 and the fixture 51 housing the clunk pin 53. The pin is operated by rod 48 connected thereto by bar 55 as shown in the first modification. The rod 48 is moved vertically by the circular hand knob 49 for positioning the clunk pin to positively connect the member 111 to the sprocket wheels, the sprocket wheels, of course, being connected with chains to the sprockets of the rear wheels 8 and 9 as shown in Fig. 2. For quickly and easily positioning the member 111 in the straight-ahead position for the wheels, a pin 120 is employed, the pin passing through a hole in the flange of member 111 and a hole in the conical support 116. The pin is maintained in either of its two positions by a spring-and-ball combination 122 operating in notches 123.

In addition to the ability to position the steering handle 44 at different angular positions, the present embodiment also provides means for obtaining another movement of the truck along predetermined paths not obtainable with the structure of Fig. 2. As explained above, the fixture 81 of Fig. 2 enabled the front and rear wheels to be positioned in parallel planes for obtaining "crab crawl" action. The present structure shown in the lower portion of Fig. 6 permits not only this type of action, but also provides means for positioning the front wheels in parallel planes different from those of the rear wheels. In other words, the new function is to obtain a fixed circular path of movement for the truck which is useful in following the action along a curved set.

Referring now to this portion of the apparatus, a bracket fixture 125 is attached to the fixture 51 and adapted to be rotated therewith, the bracket 125 having a slot 126 therein which has three depression points 127, 128 and 129. Thus, the end of rod 14 may be positioned in depression 128 so that the bolt 84 is concentric with the shaft 47 and no steering action is obtained; may be positioned at the right-hand end of the slot at depression 127 whereby "crab crawl" action is obtained, as described above; or positioned in the depression shown in the drawings, at which point the front wheels are turned in an opposite sense to those of the rear wheels when the turning handle 44 is operated. Thus, with the modification shown in Figs. 5 and 6, an increased number of fixed combination movements of the truck is possible, while at the same time obtaining complete freedom of steering action. That is, the truck may be rotated or pivoted at will when the rear wheels are disconnected from the steering mechanism; or with the steering mechanism connected to one or both sets of wheels, the truck may be guided in parallel or curved paths, the wheels being locked in any particular position to permit repetition of a predetermined path.

I claim as my invention:

1. A camera dolly truck structure for transporting a camera and its elevating and rotating mechanism from place to place comprising a frame, parallel-arranged wheels for supporting said frame, steering means for synchronously positioning all of said wheels in parallel planes to move said frame along straight lines, and means for releasing only one of two parallel wheels from said steering means.

2. A camera dolly truck structure for transporting a camera and its elevating and rotating mechanism from place to place comprising a frame, wheels for supporting said frame, steering means for synchronously positioning all of said wheels in parallel planes to move said frame along straight lines, means for releasing only one of said wheels from said steering means, locking means for locking said steering means in any adjusted position, and additional locking means for locking said steering means in a straight-ahead position, said second-mentioned locking means being operable only when said steering means are in the straight-ahead position.

3. A camera dolly comprising a frame member, front and rear wheels for transporting said frame from place to place, means interconnecting said front wheels for simultaneous steering thereof, manually operating steering means, means for interconnecting said steering means with said front wheels, means for interconnecting said steering means with said rear wheels for simultaneous steering thereof with said front wheels, and means for adjusting said last-mentioned means and said means interconnecting said steering means with said front wheels to maintain all of said wheels in planes parallel with one another when turned by said steering means, said adjusting means being adapted to disconnect only one or both of said rear wheels from said steering means.

4. A camera dolly comprising a frame member, a pair of front wheels and a pair of rear wheels adapted to be rotated for steering said dolly in any direction, means for interconnecting said front wheels for simultaneous steering thereof, manually operable steering means for all of said wheels, said means including a rotatable shaft, adjustable means for interconnecting said steering means with said front wheels for simultaneous steering operation, said adjustable means including a bracket on said shaft and a connecting rod connected to said interconnecting means for said front wheels, and a second adjustable means for individually interconnecting each of said rear wheels with said steering means, said means including a second bracket on said shaft and a connecting pin, one position of adjustment of said connecting rod on said first-mentioned bracket and said connecting pin on said second-mentioned bracket permitting rotation of all of said wheels in parallel planes by actuation of said manually operable means, a second adjustment of said connecting rod on said first-mentioned bracket maintaining said front wheels in a straight-ahead position and permitting rotation of said rear wheels in parallel planes by said manually operable means, and a third adjustment of said connecting pin on said second-mentioned bracket permitting rotation of only one of said rear wheels by actuation of said manually operable means.

5. A camera dolly in accordance with claim 4 in which means are provided for locking said manually operable steering means to said frame to position all of said wheels in a straight-ahead position.

6. A camera dolly in accordance with claim 4 in which additional means are provided for locking said manually operable steering means to said frame when said wheels are in any predetermined angular position.

7. A steering mechanism for a camera dolly truck comprising a frame, a pair of front wheels adapted to be interconnected and turned simultaneously for changing the axes of rotation thereof, a rotatable mechanism mounted at the rear of said frame, means interconnecting said mechanism with said front wheels for the simultaneous turning of the axes of said front wheels, means interconnecting said mechanism with one of said rear wheels for turning the axis thereof, a second means similar to said last-mentioned means for interconnecting said mechanism with the other of said rear wheels for turning the axis thereof, means for manually rotating said mechanism, and means associated with said mechanism for connecting and disconnecting said mechanism with and from one or both of said last two mentioned means.

8. A camera dolly truck comprising a frame, a plurality of pairs of wheels for supporting said frame, a rotatable mechanism mounted on said frame and adapted to be turned manually, means interconnecting said mechanism with certain of said wheels, means interconnecting said mechanism with certain other of said wheels individually, and adjustable means associated with said mechanism for selecting one individually connected wheel or a pair of wheels steerable by said rotatable mechanism while maintaining a connection between said wheels and said mechanism.

9. A camera dolly truck comprising a frame, a plurality of wheels for supporting said frame, a rotatable mechanism mounted on said frame and adapted to be turned manually, means interconnecting said mechanism with certain of said wheels, means interconnecting said mechanism with certain of said wheels individually, and means associated with said mechanism for varying the number of wheels connected to said rotatable mechanism, said individual interconnecting means comprising chains and sprockets, a pair of sprockets being mounted concentric with the rotatable axis of said mechanism and adapted to be connected and disconnected to and from said mechanism.

10. A camera dolly truck comprising front wheels and rear wheels, said rear wheels being mounted to said frame on vertical axes passing through the respective axes of rotation of said wheels, a mechanism mounted on said frame adapted to be manually turned, means interconnecting said front wheels for the simultaneous turning of their axes of rotation, a bracket for interconnecting said last-mentioned means with said mechanism, one position of said last-mentioned means on said bracket causing the turning of said front wheels when said mechanism is rotated, and another position thereof causing no effect on said front wheels when said mechanism is rotated, means for interconnecting each of said rear wheels to said mechanism for simultaneously turning their axes of rotation, and means for disconnecting only one of said rear wheels from said mechanism.

11. A steering mechanism for a camera dolly truck comprising a frame, front wheels for supporting said frame, rear wheels for supporting said frame, said wheels being adapted to be turned to change their respective axes of rotation for transporting said frame in different directions, a rotatable mechanism mounted on said frame and adapted to be manually rotated, radially extending means mounted on said mechanism, means for interconnecting said front wheels with said radially extending means at different points thereon, one point of connection producing turning of said front wheels in one direction when said mechanism is rotated in a definite direction, another point of connection producing turning of said front wheels in another direction when said mechanism is rotated in the same definite direction, and another point of connection producing no turning of said wheels when said mechanism is rotated, means for individually interconnecting each of said rear wheels to said rotatable mechanism for simultaneously turning their axes of rotation, and means for disconnecting only one of said rear wheels from said mechanism.

12. A steering mechanism comprising a frame, a plurality of pairs of supporting wheels for transporting said frame, a mechanism mounted on said frame and manually turnable for turning the respective axes of rotation of said wheels, and adjustable means adapted to effect the turning of the axis of only one of one pair of said wheels with said mechanism while maintaining the remaining wheels connected to said mechanism.

13. A steering mechanism comprising a frame, a plurality of supporting wheels for transporting said frame, a mechanism mounted on said frame and manually turnable for turning the respective axes of rotation of said wheels, adjustable means adapted to effect the turning of the axis of only one of said wheels with said mechanism while maintaining the remaining wheels connected to said mechanism, means for locking said mechanism to said frame in any position thereof, and a second locking means for locking said mechanism to said frame in only the position where said wheels are in a straight-ahead position, said second locking means being operable only when said wheels are in a straight-ahead position.

14. A steering mechanism comprising a frame, a plurality of wheels for supporting said frame, a rotatable steering mechanism mounted at the rear of said frame, a tie-rod between two of said wheels, a rod interconnecting said tie-rod and said steering mechanism for steering said wheels, means for individually connecting each of said remaining wheels to said steering mechanism, and means mounted on said steering means for selectively connecting and disconnecting one or both of said individually connected wheels from said steering mechanism.

HARRY G. CUNNINGHAM.